United States Patent
Wang et al.

(10) Patent No.: US 11,703,357 B2
(45) Date of Patent: Jul. 18, 2023

(54) METHOD AND SYSTEM FOR CALIBRATING LASER LEVEL

(71) Applicant: NORTHWEST INSTRUMENT INC., Dover, NJ (US)

(72) Inventors: Weichen Wang, Shanghai (CN); Xin Shi, Shanghai (CN); David Xing, Dover, NJ (US)

(73) Assignee: NORTHWEST INSTRUMENT INC., Dover, NJ (US)

( * ) Notice: Subject to any disclaimer, the term of this patent is extended or adjusted under 35 U.S.C. 154(b) by 0 days.

(21) Appl. No.: 18/148,731

(22) Filed: Dec. 30, 2022

(65) Prior Publication Data

US 2023/0141835 A1 May 11, 2023

Related U.S. Application Data

(63) Continuation of application No. PCT/CN2021/104743, filed on Jul. 6, 2021.

(30) Foreign Application Priority Data

Dec. 31, 2020 (CN) .......................... 202011622102.9

(51) Int. Cl.
*G01C 25/00* (2006.01)
*G01C 15/00* (2006.01)

(52) U.S. Cl.
CPC .......... *G01C 25/00* (2013.01); *G01C 15/006* (2013.01)

(58) Field of Classification Search
CPC .... G01C 25/00; G01C 15/002; G01C 15/004; G01C 15/006

(Continued)

(56) References Cited

U.S. PATENT DOCUMENTS 5,457,890 A * 10/1995 Mooty ................ G01C 15/002
33/294
6,688,011 B2 * 2/2004 Gamal ................ G01C 15/004
33/290

(Continued)

FOREIGN PATENT DOCUMENTS

CN 201218731 Y 4/2009
CN 102506834 A 6/2012

(Continued)

OTHER PUBLICATIONS

The World Intellectual Property Organization (WIPO) International Search Report for PCT/CN2021/104743 dated Sep. 28, 2021 6 Pages (including translation).

*Primary Examiner* — George B Bennett
(74) *Attorney, Agent, or Firm* — Anova Law Group, PLLC (57) ABSTRACT

A method for calibrating a laser level. includes arranging the laser level and a detector on a same horizontal plane to cause the laser level to be at a detected position, setting the laser level to be in a dot-sweep mode or a fan-sweep mode, when the detector detects the first laser beam for calibration emitted by the laser level, generating first position information by the detector, when the laser level rotates to a first rotation angle, rotating a laser projection direction of the laser level relative to the laser level along the opposite direction by a first rotation angle to cause the detector to detect the second laser beam for calibration emitted by the laser level to generate second position information, and determining whether the laser level needs to be calibrated based on the first position information and the second position information.

18 Claims, 5 Drawing Sheets

(58) Field of Classification Search
USPC .................................................. 33/290–296
See application file for complete search history.

(56) References Cited

U.S. PATENT DOCUMENTS

| | | | |
|---|---|---|---|
| 8,201,340 B2* | 6/2012 | Steffensen | G01C 15/06 |
| | | | 33/809 |
| 11,360,310 B2* | 6/2022 | Lawver | G06F 3/011 |
| 11,435,182 B2* | 9/2022 | Hajmousa | G01C 15/006 |
| 2021/0364285 A1* | 11/2021 | Shi | G01C 3/10 |
| 2022/0244050 A1* | 8/2022 | Honoki | G01C 15/002 |
| 2023/0097350 A1* | 3/2023 | Nishita | G06T 7/0004 |
| | | | 356/4.01 |

FOREIGN PATENT DOCUMENTS

| | | |
|---|---|---|
| CN | 106258025 A | 1/2017 |
| CN | 111024118 A | 4/2020 |
| CN | 112611395 A | 4/2021 |
| JP | 2006058053 A | 3/2006 |

\* cited by examiner

METHOD AND SYSTEM FOR CALIBRATING LASER LEVEL

CROSS-REFERENCES TO RELATED APPLICATIONS

This application is a continuation of International Application No. PCT/CN2021/104743, filed on Jul. 6, 2021, which claims priority of Chinese patent application No. 202011622102.9, filed with the State Intellectual Property Office of P. R. China on Dec. 31, 2020, the entire contents of both of which are incorporated herein by reference in their entirety.

TECHNICAL FIELD

The present disclosure relates to the intelligent measurement field and, more particularly, to a method and a system for calibrating a laser level.

BACKGROUND

Horizontal axis precision of a laser level refers to a range of an included angle between a laser plane of the leveler and an absolute horizontal plane in each direction of four directions of the horizontal plane front, back, left, and right, when the laser level performs horizontal plane scanning after the laser level is normally leveled. According to geometric principles, the horizontal axis precision also represents a height range beyond a certain distance.

The existing method for calibrating the laser level is suitable for calibrating the laser level in the rotation scanning mode. Since a detector needs to distinguish a laser beam of the laser level from the ambient light, a feature of the laser level of "periodically scanning the detector to generate a photoelectric signal" is normally used. Generally, a period is required to be a certain value or several fixed values. Therefore, the existing calibration method is not suitable for the laser level operating in a fan-sweep mode or dot-sweep mode.

SUMMARY

For the above problem, a first aspect of the present disclosure provides a method for calibrating a laser level, which includes:
  arranging the laser level and a detector on a same horizontal plane to cause the laser level to be at a detected position;
  setting the laser level to a dot-sweep mode or a fan-sweep mode;
  in response to the detector detecting a first laser beam for calibration emitted by the laser level, generating first position information by the detector;
  in response to the laser level rotating to a first rotation angle, rotating a laser projection direction of the laser level relative to the laser level by a first rotation angle in an opposite direction to cause the detector to detect a second laser beam for calibration emitted by the laser level to generate second position information; and
    based on the first position information and the second position information, determining whether the laser level needs to be calibrated.

According to an exemplary embodiment of the present disclosure, the method further includes:
  receiving the first position information and the second position information by the laser level, generating calibration information, and performing calibration based on the calibration information when the calibration information exceeds a threshold; or
  receiving the calibration information generated by the detector based on the first position information and the second position information and performing the calibration based on the calibration information when the calibration information exceeds the threshold.

According to an exemplary embodiment of the present disclosure, the method further includes generating calibration information by the detector based on the first position information and the second position information, and when the calibration information exceeds a threshold, sending the calibration information to the laser level to cause the laser level to perform calibration based on the calibration information.

According to an exemplary embodiment of the present disclosure, the method further includes:
  before the laser level is ready to emit the first laser beam for calibration to the detector, performing a leveling operation on the laser level; and
  after the laser level is rotated to a first rotation angle, performing a leveling operation on the laser level.

According to an exemplary embodiment of the present disclosure, setting the laser level in the dot-sweep mode or the fan-sweep mode further includes:
  setting the laser level to be in the dot-sweep mode; and
  applying a pulse signal to the laser level to cause the laser level to emit the first and second laser beams for calibration, a frequency of the first and second laser beams for calibration being same as a frequency of the pulse signal.

According to an exemplary embodiment of the present disclosure, setting the laser level in the dot-sweep mode or the fan-sweep mode further includes:
  setting the laser level to be in the fan-sweep mode; and
  applying a pulse signal to the laser level to cause the laser level to emit the first and second laser beams for calibration, a frequency of the first and second laser beams for calibration being generated by combining a frequency of the pulse signal and a fan-sweep frequency.

According to an exemplary embodiment of the present disclosure, the pulse signal has a fixed frequency or a variable frequency.

According to an exemplary embodiment of the present disclosure, setting the laser level in the dot-sweep mode or the fan-sweep mode further includes:
  setting the laser level to be in the fan-sweep mode; and
  causing the first and second laser beams emitted by the laser level to be used for calibration.

For the above problem, a second aspect of the present disclosure provides a system for calibrating a laser level, which includes:
  a laser level configured to generate a first laser beam and a second laser beam for calibration in a calibration state; and
  a detector configured to obtain the first and second laser beams for calibration;
  wherein:
    the laser level and the detector are arranged on a same horizontal plane to cause the laser level to be at a detected position; and
    the laser level is in a dot-sweep mode or a fan-sweep mode.

According to an exemplary embodiment of the present disclosure, the laser level includes:

a housing;

a control circuit arranged in the housing;

a pulse signal generation circuit arranged in the housing, electrically coupled to the control circuit, and controlled by the control circuit to generate a pulse signal;

a laser circuit arranged in the housing, electrically coupled to the pulse signal generation circuit, and generating the first and second laser beams for calibration by using the pulse signal in the calibration state; and a laser rotation unit arranged in the housing, electrically coupled to the control circuit, and configured to control and adjust a projection direction of the first and second laser beams emitted by the laser circuit.

According to an exemplary embodiment of the present disclosure, the laser rotation unit includes:

a motor coupled to the control circuit; and an optical circuit coupled to the motor, configured to change a direction of the first and second laser beams emitted by the laser level, and in response to the control circuit controlling the motor to drive the optical circuit to rotate.

According to an exemplary embodiment of the present disclosure, the detector is further configured to:

generate first position information in response to the first laser beam for calibration being detected for a first time;

generate second position information in response to the second laser beam for calibration being detected for a second time;

generate calibration information based on the first position information and the second position information; and in response to the calibration information exceeding a threshold, send the calibration information to the laser level.

According to an exemplary embodiment of the present disclosure, the laser level is further configured to:

emit the first laser beam for calibration to cause the detector to receive the first laser beam for calibration;

in response to the housing being rotated to a first rotation angle, rotate the laser rotation unit relative to the housing by the first rotation angle in the opposite direction to cause the second laser beam for calibration emitted by the laser circuit to be received by the detector; and in response to the calibration information exceeding a threshold, receive the calibration information and perform calibration based on the calibration information.

According to an exemplary embodiment of the present disclosure, a frequency of the first and second laser beams for calibration is same as a frequency of a pulse signal in response to the laser level being in the dot-sweep mode.

According to an exemplary embodiment of the present disclosure, a frequency of the first and second laser beams for calibration is generated by combining a frequency of a pulse signal and a fan sweep frequency in response to the laser level being in the fan-sweep mode.

According to an exemplary embodiment of the present disclosure, the pulse signal has a fixed frequency or a variable frequency.

According to an exemplary embodiment of the present disclosure, the laser level is further configured to:

set the laser level to be in the fan-sweep mode; and cause the first and second laser beams emitted by the laser level to be used for calibration According to an exemplary embodiment of the present disclosure, the laser level is further configured to:

before the laser level is ready to emit the first and second laser beams for calibration to the detector, perform a leveling operation on the laser level; and after the laser level is rotated to a first rotation angle, perform the leveling operation on the laser level.

The method and system for calibrating a laser level according to the present disclosure can generate first position information by the detector when the detector detects a laser beam emitted by the laser level for calibration. When the laser level rotates to the first rotation angle, the laser projection direction of the laser level is rotated relative to the laser level along the opposite direction by the first rotation angle to cause the detector to detect the laser beam for calibration emitted by the laser level to generate second position information. The laser level that is in the fan-sweep mode or the dot-sweep mode is calibrated. Thus, a user can more flexibly choose the laser level to be in different working modes to realize the calibration.

BRIEF DESCRIPTION OF THE DRAWINGS

The features, advantages, and other aspects of embodiments of the present disclosure will become more apparent in connection with the accompanying drawings and with reference to the following detailed description. Embodiments of the present disclosure are illustrated exemplarily non-limitingly. In the accompanying drawings.

DETAILED DESCRIPTION OF THE EMBODIMENTS

Various exemplary embodiments of the present disclosure are described in detail below with reference to the accompanying drawings. The flowchart and block diagrams in the accompanying drawings illustrate the architecture, function, and operation of possible implementations of the methods and systems according to embodiments of the present disclosure. It should be noted that each block in the flowchart or block diagram may represent a module, program segment, or portion of codes, which may include one or more executable instructions used to implement logic functions defined in embodiments of the present disclosure. It should also be noted that, in some alternative embodiments, the functions noted in the block may occur in a different order noted in the accompanying drawings. For example, two blocks shown in the connection may in fact be executed substantially in parallel, or the blocks may sometimes be executed in a reverse order, which depends upon the involved functions. It should also be noted that each block of the flowchart and/or block diagram and a combination of blocks in the flowchart and/or block diagram can be implemented using a dedicated hardware-based system that performs a specified function or operation or can be implemented using a combination of dedicated hardware and computer instructions The terms "including," "comprising," and similar terms used here should be understood as open-ended terms, i.e., "including/comprising but not limited to," which means that other contents may also be included. The term "based on" is "at least partially based on." The term "one embodiment" means "at least one embodiment." The term "another embodiment" means "at least one additional embodiment," and so on.

The present disclosure mainly focuses on the following technical problems: how to realize the calibration of the laser level when the laser level is in a dot-sweep mode or a fan-sweep mode.

In order to solve the above problem, according to a general concept of the present disclosure, a method for calibrating the laser level may be provided and may include arranging the laser level and a detector on a same horizontal plane to cause the laser level to be in a detected position, setting the laser level to be in the dot-sweep mode or fan-sweep mode, when the detector detects a laser beam for calibration emitted by the laser level, generating first position information by the detector, when the laser level rotates to a first rotation angle, rotating a laser projection direction of the laser level for a first rotation angle along an opposite direction relative to the laser level to cause the detector to detect the laser beam for calibration emitted by the laser level to generate second position information, and determining whether calibration needs to be performed on the laser level based on the first position information and the second position information.

Embodiment 1

Figure 1:
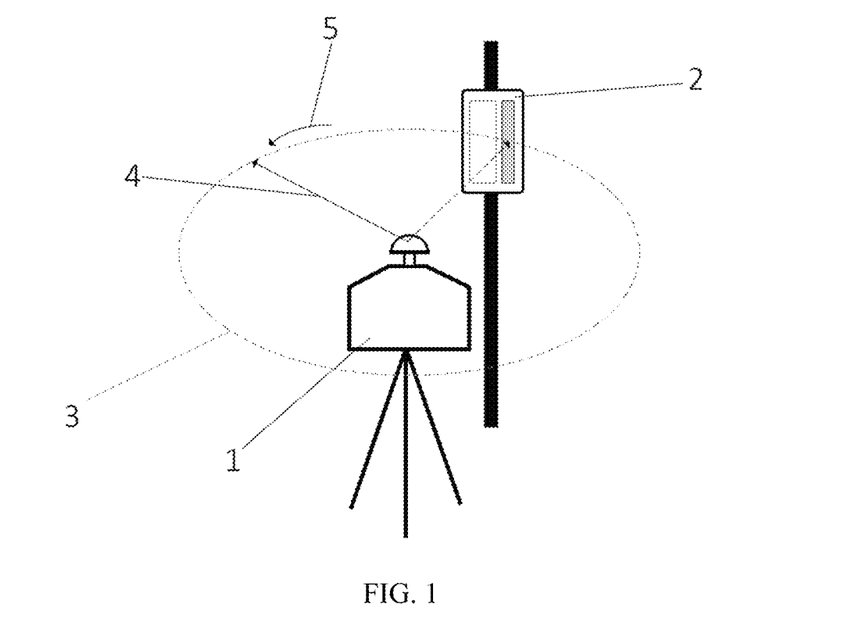
FIG. 1 is a schematic diagram of a system for calibrating a laser level according to an embodiment of the disclosure.

As shown in FIG. 1, a laser tracking system is disclosed and includes a laser level 1 and a detector 2 that is arranged on a same horizontal plane with laser level 1 at an interval. Before calibrating laser level 1, it is necessary to realize the tracking of laser level 1 to detector 2 to determine the detected position of the laser level.

In this embodiment, laser level 1 may be at least configured to emit a laser beam to perform circular scanning. Detector 2 may be at least configured to receive the laser beam. Further, detector 2 may include a first wireless communication module, and laser level 1 may include a second wireless communication module. When detector 2 detects the laser beam, the first wireless communication module may send a detection signal to the second wireless communication module of laser level 1. The first wireless communication module and the second wireless communication module may be configured to implement wireless communication (e.g., Bluetooth communication technology, etc.) using any communication technology currently known or developed in the future.

Figure 3:
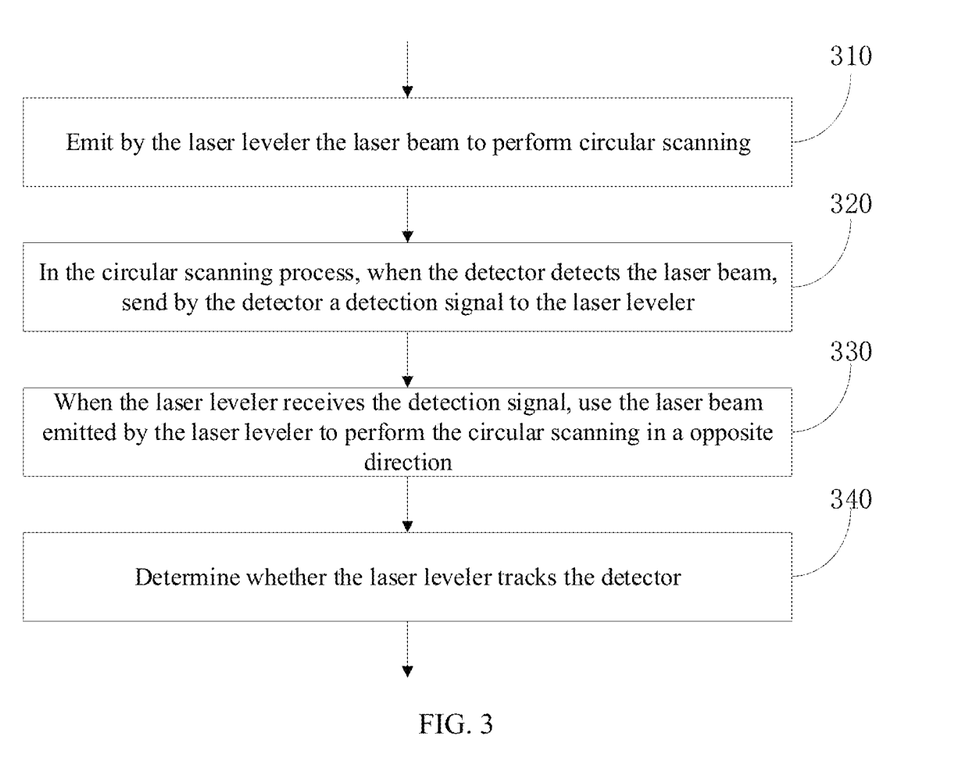
FIG. 3 is a schematic flowchart of a method of using a laser level to track a detector according to an embodiment of the disclosure.

FIG. 3 discloses the method of using the laser level to track the detector in a laser tracking system of the present embodiment. The specific operation is as follows.

First, laser level 1 and detector 2 may be arranged in the same horizontal plane, and the communication between laser level 1 and detector 2 may be established simultaneously. Specifically, as shown in FIG. 1, laser level 1 and detector 2 are spaced at a fixed distance or a distance that can be measured by the detector. With the distance, detector 2 may precisely detect the laser beam emitted by laser level 1. Laser level 1 may emit the laser beam 4 and rotate circularly in a fixed speed (e.g., along direction 5) to form a laser plane 3. Detector 2 may be arranged in a scan area of the laser plane 3. Thus, detector 2 may detect the laser beam emitted by laser level 1.

At 310, laser level 1 emits the laser beam to perform circular scanning.

Specifically, laser level 1 may perform the circular scanning at a first rate. The first rate is a rate at which detector 2 can detect the laser beam.

At 320, in the circular scanning process, when detector 2 detects the laser beam, detector 2 sends a detection signal to laser level 1.

Specifically, in the circular scanning process, when detector 2 detects the laser beam, the first wireless communication module may send the detection signal to the second wireless communication module of laser level 1.

At 330, when laser level 1 receives the detection signal, the laser beam emitted by laser level 1 is used to perform the circular scanning in the opposite direction.

In the present embodiment, in step 330, when the second wireless communication module of laser level 1 receives the detection signal, laser level 1 may perform the circular scanning in the opposite direction at a second rate. The second rate may be smaller than the current rate of the laser level. The second rate is the rate at which detector 2 can detect the laser beam.

Return to perform step 320, until a frequency of the detection signal received by the laser level is greater than a first threshold, step 340 may be performed.

Alternatively, return to perform step 320, until a time interval of changing the scanning direction of the circular scanning by laser level 1 is smaller than a second threshold, step 340 may be performed.

In this embodiment, in a process of repeatedly performing steps 320 and 330, the rate of the circular scanning performed by laser level 1 may decrease in a stepwise manner with the change of each scanning direction.

At 340, the laser level tracks the detector is determined.

Specifically, since laser level 1 performs the circular scanning back and forth (for example, after receiving the detection signal, the circular scanning in the opposite direction is realized), thus, the frequency that laser level 1 performs circular scanning back and forth may be higher and higher. Thus, the frequency of detector 2 receiving the laser beam may become higher, and the frequency of detector 2 sending the detection signal may be higher and higher. When the frequency of laser level 1 receiving the detection signal is higher than the threshold (e.g., first threshold) set internally, it indicates that laser level 1 has tracked detector 2, i.e., reaches the detected position.

Alternatively, since laser level 1 performs the circular scanning back and forth (for example, after receiving the detection signal, the circular scanning in the opposite direction is realized), thus, the frequency that laser level 1 performs circular scanning back and forth may be higher and higher. When the time interval of laser level 1 changing the scanning direction of the circular scanning is smaller than the threshold (e.g., the second threshold) set internally, it indicates that laser level 1 has tracked detector 2, i.e., reaches the detected position.

In addition, after step 340, at the position where laser level 1 tracks detector 2, laser level 1 may be set to enter the fan-sweep mode or the dot-sweep mode.

The method and system for the laser level tracking the detector disclosed in the present embodiment may realize tracking the detector by the laser level to accurately determine the detected position only in the situation that the detector can receive the laser beam when a leveling operation does not need to be performed on the laser level and the detector. That is, the method and system for tracking the detector by the laser level disclosed in Embodiment 1 may be simply operated, have a simple structure, and realize accurate positioning for the detected position.

Embodiment 2

As shown in FIG. 1, the system for calibrating the laser level is disclosed and includes laser level 1 configured to generate the laser beam for calibration in a calibration state and a detector 2 configured to obtain the laser beam for calibration. Laser level 1 and detector 2 are arranged on the same horizontal plane. Thus, laser level 1 is at the detected position. Laser level 1 may be set to the dot-sweep mode or the fan-sweep mode.

Figure 2:
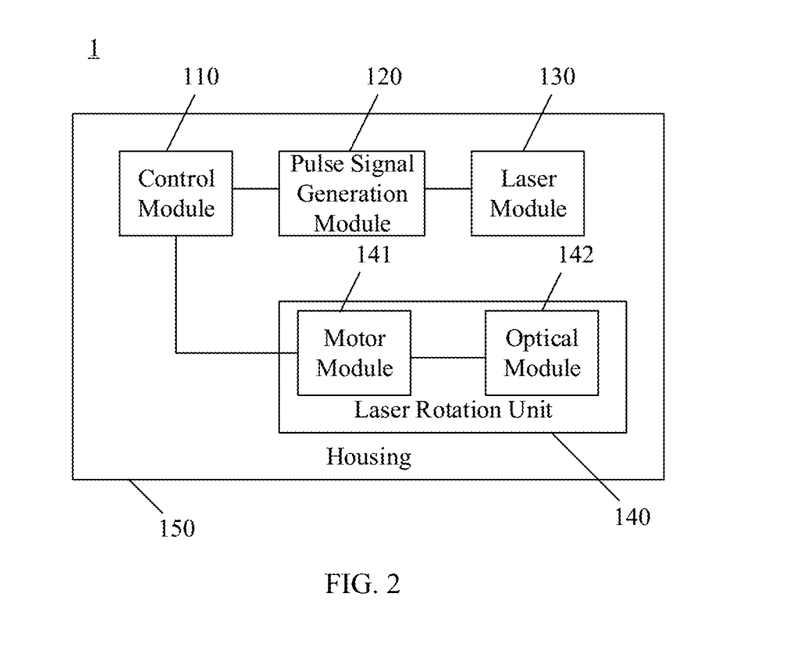
FIG. 2 is a schematic block diagram of a system for calibrating a laser level according to an embodiment of the disclosure.

In addition, laser level 1 shown in FIG. 2 includes a housing 150, a control circuit 110, a pulse signal generation circuit 120, a laser circuit 130, and a laser rotation unit 140. The control circuit 110 may be arranged in the housing 150. The pulse signal generation circuit 120 may be arranged in the housing 150 and be electrically coupled to the control circuit 110 to be controlled by the control circuit 110 to generate a pulse signal. The laser circuit 130 may be arranged in the housing 150 and be electrically coupled with the pulse signal generation circuit 120. In the calibration state, with the pulse signal, the laser circuit 130 may be configured to generate the laser beam for calibration. The laser rotation unit 140 may be arranged in the housing 150, be electrically coupled with the control circuit 110, and be configured to control and adjust the projection direction of the laser beam generated by the laser circuit 130.

In addition, the laser rotation unit 140 includes a motor 141 and an optical circuit 142. The motor 141 may be electrically coupled to the control circuit 110. The optical circuit may be electrically coupled to the motor 141 and configured to change the direction of the laser beam. When the control circuit 110 controls the motor 141 to drive the optical circuit 142 to rotate, the direction of the laser beam emitted by laser level 1 may be changed.

Based on the system of using the laser level to track the detector disclosed in Embodiment 1, laser level 1 can accurately determine the detected position corresponding to the detector. FIG. 3 shows the method of using the laser level to track the detector in the laser tracking system of the present embodiment. The laser tracking system is also configured to perform a method for calibrating the laser level. The method for calibrating the laser level is disclosed in FIG. 4. In some embodiments, the process shown in FIG. 4 can be performed after the process shown in FIG. 3 is completed.

Figure 4:
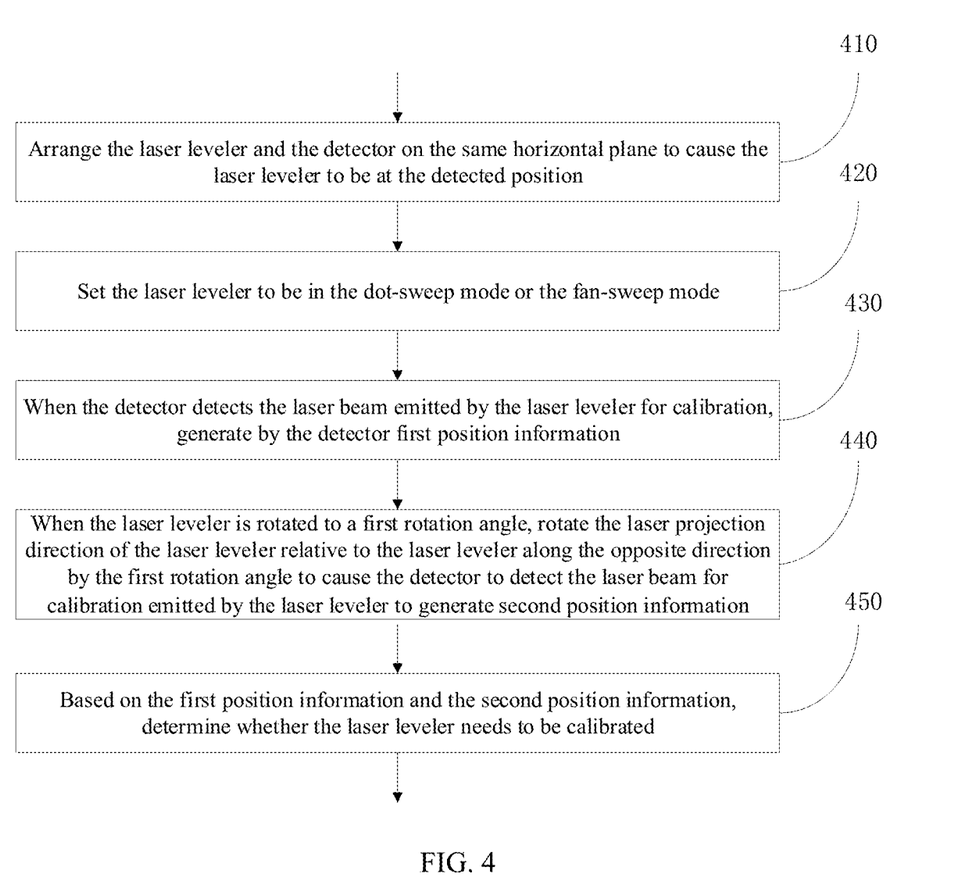
FIG. 4 is a schematic flowchart of a method of calibrating a laser level according to an embodiment of the disclosure.

FIG. 4 discloses the method for the calibration laser level of the present embodiment. The specific operation is as follows.

At 410, laser level 1 and detector 2 are arranged on the same horizontal plane to cause laser level 1 to be at the detected position.

Figure 5:
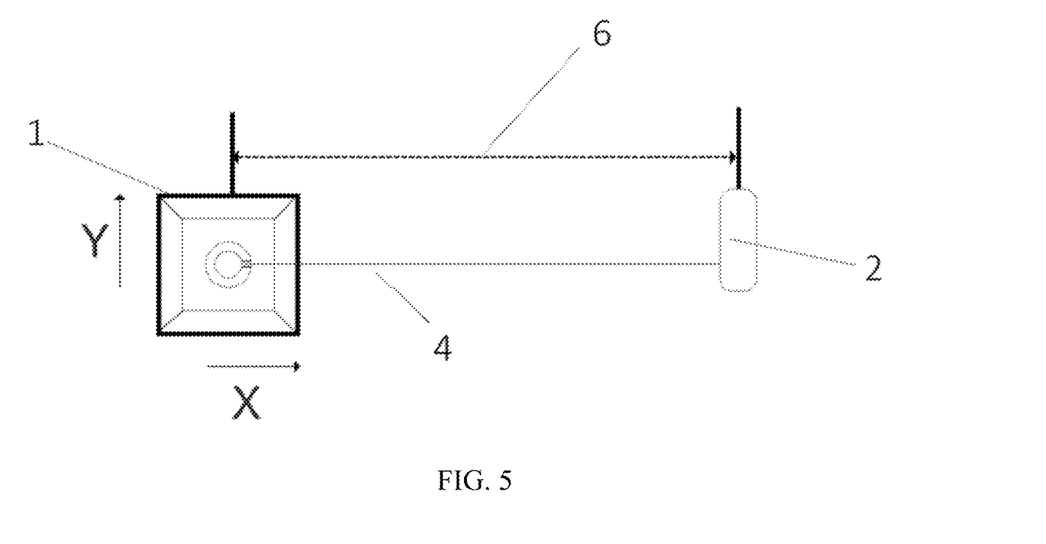
FIG. 5 is a first schematic diagram showing calibrating a laser level according to an embodiment of the disclosure.

As shown in FIG. 5, in this step, laser level 1 and detector 2 are arranged on the same horizontal plane with the distance 6. Before laser level 1 is ready to emit the laser beam for calibration to detector 2, the leveling operation may be performed on laser level 1. In some embodiments, after laser level 1 is turned on, an automatic leveling operation may be first performed. That is, laser level 1 may adjust an X-axis and a Y-axis to a horizontal state determined by laser level 1 through water bubble detection.

At 420, laser level 1 is set to be in the dot-sweep mode or the fan-sweep mode.

Detector 2 can receive beams of various frequencies (for example, natural light, etc.) from a calibration environment during the calibration process of laser level 1. In addition, laser level 1 is in the dot-sweep mode or the fan-sweep mode, which is different from the conventional leveler configured to emit a periodical laser beam for the detector to receive different beams. Thus, to cause detector 2 to accurately receive the laser beam from laser level 1 and overcome the existing technical defects, laser level 1 needs to still emit the laser beam with a single frequency that has on-off or bright-dark changes in the dot-sweep mode or fan-sweep mode to facilitate detection of detector 2.

This step includes:
at 420.1, setting laser level 1 to be in the dot-sweep mode; and
at 420.2, in the calibration state, controlling the pulse signal generation circuit 120 to generate a pulse signal by the control circuit 110 of laser level 1, and using the pulse signal to generate the laser beam for calibration by the laser circuit 130, the frequency of the laser beam for calibration being same as a frequency limit of the above pulse signal.

Alternatively, step 420 includes:
at 421.1, setting laser level 1 to be in the fan-sweep mode; and
at 421.2, in the calibration state, applying the pulse signal to laser level 1 to cause laser level 1 to emit the laser beam for calibration. The frequency of the laser beam for calibration may be generated by combining the frequency of the pulse signal and the fan-sweep frequency. Specifically, the control circuit 110 of laser level 1 may control the pulse signal generation circuit 120 to generate the pulse signal. The laser circuit 130 may use the pulse signal to generate the laser beam for calibration.

The pulse signal mentioned in this embodiment has a fixed frequency or a variable frequency that can be detected by detector 2.

Alternatively, step 420 includes:
at 422.1, setting laser level 1 to be in the fan-sweep mode; and
at 422.2, causing the laser beam emitted by laser level 1 to be used as the laser beam for calibration.

That is, in the fan-sweep mode, the fan-sweep frequency of laser level 1 may be used as the frequency of the laser beam for calibration received by detector 2.

At 430, when detector 2 detects the laser beam emitted by laser level 1 for calibration, the detector generates first position information.

Figure 6:
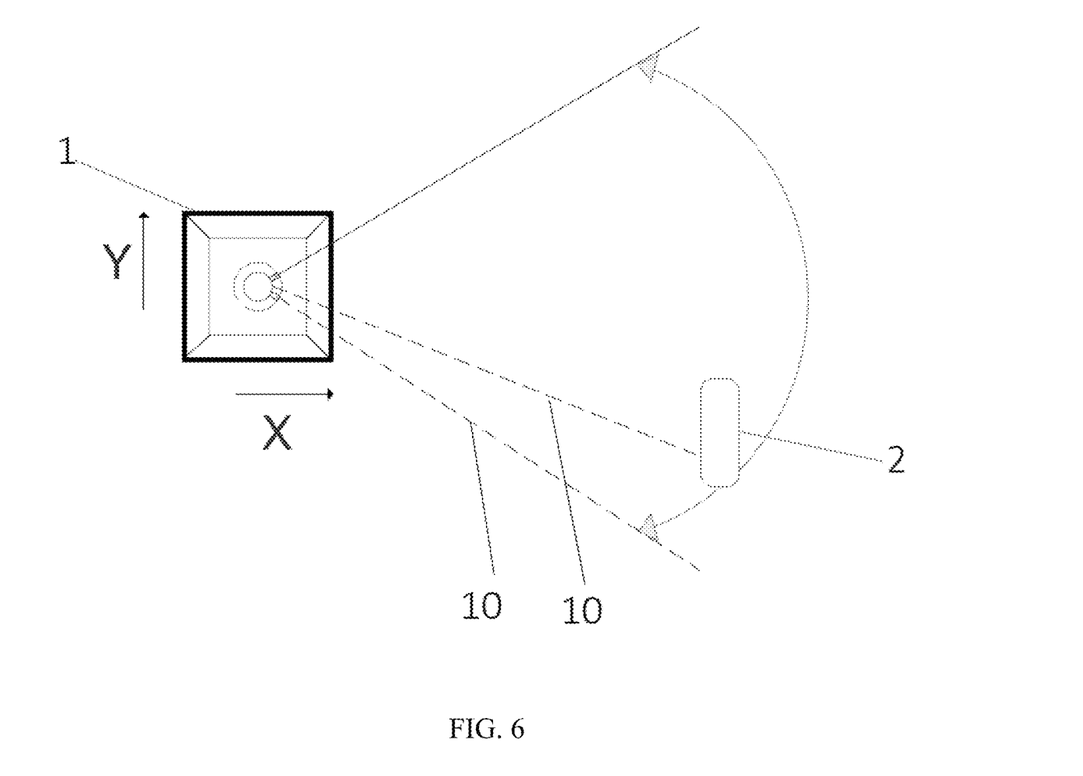
FIG. 6 is a second schematic diagram showing calibrating a laser level according to an embodiment of the disclosure.

As shown in FIG. 6, laser level 1 performs a circular motion, so that the laser beam 10 emitted by laser level 1 for calibration is detected by detector 2.

Figure 7:
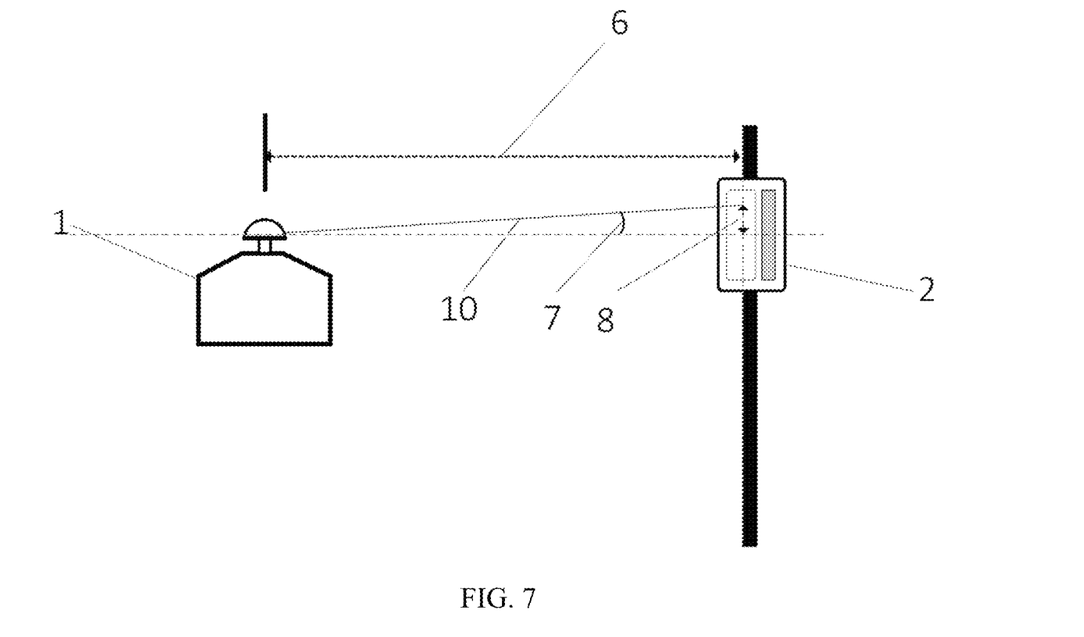
FIG. 7 is a third schematic diagram showing calibrating a laser level according to an embodiment of the disclosure.

As shown in FIG. 7, when detector 2 detects the laser beam 10 for calibration emitted by laser level 1, the first position information detected by the detector is first height information 8 or first angle information 7 generated based on the distance 6 and the first height information 8.

At 440, when laser level 1 is rotated to a first rotation angle, the laser projection direction of the laser level is rotated relative to the laser level along the opposite direction by the first rotation angle to cause the detector to detect the laser beam for calibration emitted by the laser level to generate second position information.

In some embodiments, when laser level 1 is rotated to the first rotation angle, laser level 1 may perform the leveling operation again. In this embodiment, the first rotation angle may be any angle, preferably 90°, 180°, and 270°. According to the selected angle, the calibration process may need to be repeatedly performed many times. For example, after the calibration of the X-axis is completed, laser level 1 is rotated by 90°, and the same operation as the calibration of the X-axis may be repeated to realize the calibration of the Y-axis.

When the housing 150 is rotated to the first rotation angle, the laser rotation unit 140 may be rotated relative to the housing 150 by the first rotation angle in the opposite direction. Thus, the laser beam 10 for calibration emitted by the laser circuit 130 may be received by detector 2.

Figure 8:
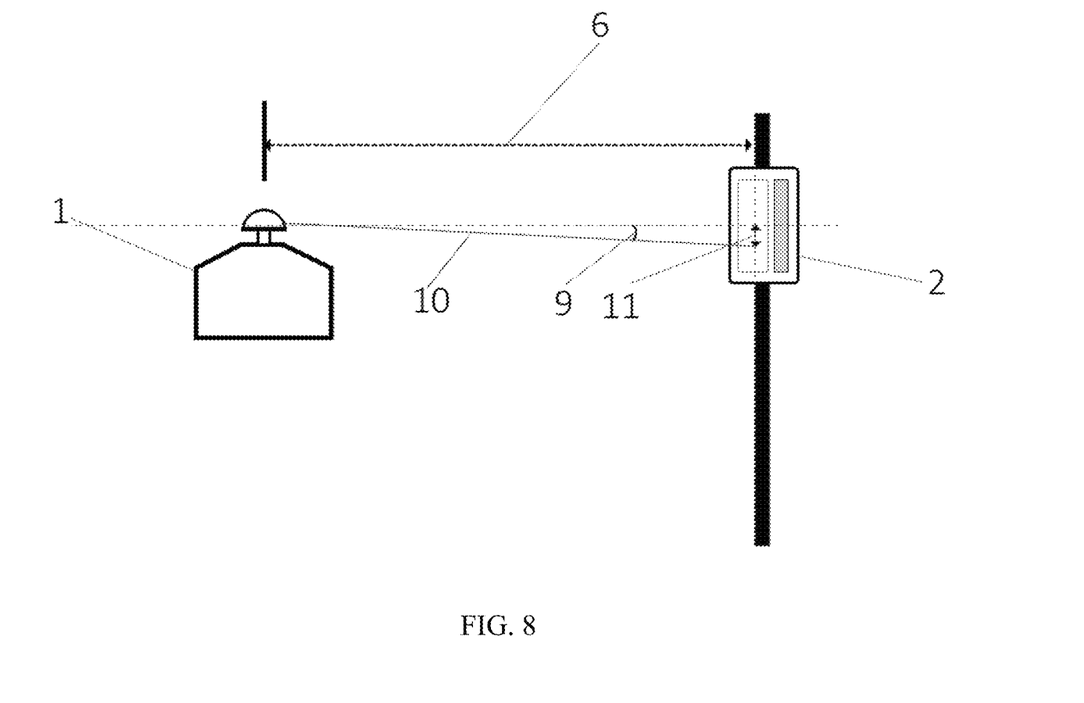
FIG. 8 is a fourth schematic diagram showing calibrating a laser level according to an embodiment of the disclosure.

As shown in FIG. 8, when detector 2 detects the laser beam 10 for calibration emitted by laser level 1, the second position information detected by detector 2 is second height information 11 or second angle information 9 generated based on the distance 6 and the second height information 11.

At 450, based on the first position information and the second position information, whether the laser level needs to be calibrated is determined.

This step includes:

receives the first position information and the second position information by laser level 1, generating the calibration information, and when the calibration information exceeds a set threshold, performing calibration based on the calibration information; or receiving the calibration information generated by detector 2 based on the first position information and the second position information by laser level 1, and when the calibration information exceeds the set threshold, performing the calibration based on the calibration information; or generating the calibration information based on the first position information and the second position information by detector 2, and when the calibration information exceeds the set threshold, sending the calibration information to laser level 1 to cause laser level 1 to perform the calibration based on the calibration information.

In this embodiment, for example, the calibration information may be an average value of differences between the first height information 8 and the second height information 11 or an average value of differences between the first angle information 7 and the second angle information 9.

The disclosed method and system for calibrating the laser level in the present embodiment can realize the calibration when the laser level is in the dot-sweep mode or the fan-sweep mode, which greatly improves the application scope of the calibration technique and brings greater convenience for an actual user of the laser level.

Techniques, methods, and devices known to those of ordinary skill in the art may not be discussed in detail, but where appropriate, such techniques, methods, and devices should be considered a part of the specification. The connection lines between the units in the accompanying drawings are only for the convenience of description, which means that at least the units at both ends of the lines communicate with each other and are not intended to limit the unconnected units not to communicate.

The above are only some embodiments of the present disclosure and are not intended to limit embodiments of the present disclosure. For those skilled in the art, embodiments of the present disclosure may have various modifications and changes. Any modifications, equivalent replacements, improvements, etc. made within the spirit and principles of embodiments of the present disclosure should be included within the protection scope of embodiments of the present disclosure.

Although embodiments of the present disclosure have been described with reference to several specific embodiments, it should be understood that embodiments of the present disclosure are not limited to the specific embodiments disclosed. Embodiments of the present disclosure are intended to cover various modifications and equivalent arrangements included within the spirit and scope of the appended claims. The scope of the appended claims conforms to the broadest interpretation so as to include all such modifications and equivalent structures and functions.

What is claimed is:

1. A method of calibrating a laser level comprising:
    arranging the laser level and a detector on a same horizontal plane to cause the laser level to be at a detected position;
    setting the laser level to a dot-sweep mode or a fan-sweep mode;
    in response to the detector detecting a first laser beam for calibration emitted by the laser level, generating first position information by the detector;
    in response to the laser level rotating to a first rotation angle, rotating a laser projection direction of the laser level relative to the laser level by a first rotation angle in an opposite direction to cause the detector to detect a second laser beam for calibration emitted by the laser level to generate second position information; and
    based on the first position information and the second position information, determining whether the laser level needs to be calibrated.

2. The method of claim 1, further comprising:
    receiving the first position information and the second position information by the laser level, generating calibration information, and performing calibration based on the calibration information in response to the calibration information exceeding a threshold; or
    receiving the calibration information generated by the detector based on the first position information and the second position information and performing the calibration based on the calibration information in response to the calibration information exceeding the threshold.

3. The method of claim 1, further comprising:
    generating calibration information by the detector based on the first position information and the second position information, and in response to the calibration information exceeding a threshold, sending the calibration information to the laser level to cause the laser level to perform calibration based on the calibration information.

4. The method of claim 1, further comprising:
    before the laser level is ready to emit the first laser beam for calibration to the detector, performing a leveling operation on the laser level; and
    after the laser level is rotated to a first rotation angle, performing the leveling operation on the laser level.

5. The method of claim 1, wherein setting the laser level in the dot-sweep mode or the fan-sweep mode further includes:
    setting the laser level to be in the dot-sweep mode; and
    applying a pulse signal to the laser level to cause the laser level to emit the first and second laser beams for calibration, a frequency of the first and second laser beams for calibration being same as a frequency of the pulse signal.

6. The method of claim 1, wherein setting the laser level in the dot-sweep mode or the fan-sweep mode further includes:
setting the laser level to be in the fan-sweep mode; and
applying a pulse signal to the laser level to cause the laser level to emit the first and second laser beams for calibration, a frequency of the first and second laser beams for calibration being generated by combining a frequency of the pulse signal and a fan-sweep frequency.

7. The method of claim 6, wherein the pulse signal has a fixed frequency or a variable frequency.

8. The method of claim 1, wherein setting the laser level in the dot-sweep mode or the fan-sweep mode further includes:
setting the laser level to be in the fan-sweep mode; and
causing the first and second laser beams emitted by the laser level to be used for calibration.

9. A system for calibrating a laser level comprising:
a laser level configured to generate a first laser beam and a second laser beam for calibration in a calibration state; and
a detector configured to obtain the first and second laser beams for calibration;
wherein:
the laser level and the detector are arranged on a same horizontal plane to cause the laser level to be at a detected position; and
the laser level is in a dot-sweep mode or a fan-sweep mode.

10. The system of claim 9, wherein the laser level includes:
a housing;
a control circuit arranged in the housing;
a pulse signal generation circuit arranged in the housing, electrically coupled to the control circuit, and controlled by the control circuit to generate a pulse signal;
a laser circuit arranged in the housing, electrically coupled to the pulse signal generation circuit, and generating the first and second laser beams for calibration by using the pulse signal in the calibration state; and
a laser rotation unit arranged in the housing, electrically coupled to the control circuit, and configured to control and adjust a projection direction of the first and second laser beams emitted by the laser circuit.

11. The system of claim 10, wherein the laser rotation unit includes:
a motor coupled to the control circuit; and
an optical circuit coupled to the motor, configured to change a direction of the first and second laser beams emitted by the laser level, and in response to the control circuit controlling the motor to drive the optical circuit to rotate.

12. The system of claim 9, wherein the detector is further configured to:
generate first position information in response to the first laser beam for calibration being detected for a first time;
generate second position information in response to the second laser beam for calibration being detected for a second time;
generate calibration information based on the first position information and the second position information; and
in response to the calibration information exceeding a threshold, send the calibration information to the laser level.

13. The system of claim 10, wherein the laser level is further configured to:
emit the first laser beam for calibration to cause the detector to receive the first laser beam for calibration;
in response to the housing being rotated to a first rotation angle, rotate the laser rotation unit relative to the housing by the first rotation angle in the opposite direction to cause the second laser beam for calibration emitted by the laser circuit to be received by the detector; and
in response to the calibration information exceeding a threshold, receive the calibration information and perform calibration based on the calibration information.

14. The system of claim 9, wherein a frequency of the first and second laser beams for calibration is same as a frequency of a pulse signal in response to the laser level being in the dot-sweep mode.

15. The system of claim 9, wherein a frequency of the first and second laser beams for calibration is generated by combining a frequency of a pulse signal and a fan sweep frequency in response to the laser level being in the fan-sweep mode.

16. The system of claim 15, wherein the pulse signal has a fixed frequency or a variable frequency.

17. The system of claim 9, wherein the laser level is further configured to:
set the laser level to be in the fan-sweep mode; and
cause the first and second laser beams emitted by the laser level to be used for calibration.

18. The system of claim 9, wherein the laser level is further configured to:
before the laser level is ready to emit the first and second laser beams for calibration to the detector, perform a leveling operation on the laser level; and
after the laser level is rotated to a first rotation angle, perform the leveling operation on the laser level.

* * * * *